United States Patent
Kaneko (10) Patent No.: US 8,378,598 B2
(45) Date of Patent: Feb. 19, 2013

(54) MOTOR CONTROL APPARATUS AND MOTOR CONTROL METHOD

(75) Inventor: Youichi Kaneko, Kosai (JP)

(73) Assignee: ASMO Co., Ltd., Shizuoka-pref. (JP)

( * ) Notice: Subject to any disclaimer, the term of this patent is extended or adjusted under 35 U.S.C. 154(b) by 506 days.

(21) Appl. No.: 12/656,202

(22) Filed: Jan. 21, 2010

(65) Prior Publication Data

US 2010/0194320 A1 Aug. 5, 2010

(30) Foreign Application Priority Data

Feb. 2, 2009 (JP) .................................. 2009-21525

(51) Int. Cl.
*H02K 33/00* (2006.01)
(52) U.S. Cl. ........ 318/114; 318/115; 318/128; 318/136; 318/432
(58) Field of Classification Search ............. 318/400.01, 318/400.02, 721, 727, 799, 432, 136, 114, 318/115, 128, 460; 324/76.51
See application file for complete search history.

(56) References Cited

U.S. PATENT DOCUMENTS

| | | | |
|---|---|---|---|
| 6,653,829 B1 * | 11/2003 | Henry et al. | 324/207.21 |
| 6,859,001 B2 * | 2/2005 | Kane et al. | 318/400.23 |
| 7,474,067 B2 | 1/2009 | Ueda et al. | |
| 7,952,308 B2 * | 5/2011 | Schulz et al. | 318/400.23 |

FOREIGN PATENT DOCUMENTS

| JP | A-2001-095274 | 4/2001 |
|---|---|---|
| JP | A-2009-261121 | 11/2009 |

* cited by examiner

*Primary Examiner* — Antony M Paul
(74) *Attorney, Agent, or Firm* — Posz Law Group, PLC (57) ABSTRACT

In a polyphase electric motor, a voltage is sequentially applied to a plurality of windings on a phase-by-phase basis. Then, there is sensed a rotational speed of a rotor, which is rotated by a rotating magnetic field that is generated by sequentially flowing an electric current in the windings on the phase-by-phase basis upon the sequential application of the voltage to the windings. Then, an oscillation frequency of a periodic oscillation, which is generated in the motor at the sensed rotational speed of the rotor, is obtained. Thereafter, it is determined whether the obtained oscillation frequency is a predetermined resonance frequency. Next, the voltage to be applied to the windings is corrected in a manner that reduces a resonance generated in the motor when a result of the determination indicates that the obtained oscillation frequency is the predetermined resonance frequency.

11 Claims, 6 Drawing Sheets

MOTOR CONTROL APPARATUS AND MOTOR CONTROL METHOD

CROSS REFERENCE TO RELATED APPLICATION

This application is based on and incorporates herein by reference Japanese Patent Application No. 2009-21525 filed on Feb. 2, 2009.

BACKGROUND OF THE INVENTION

1. Field of the Invention

The present invention relates to a motor control apparatus and a motor control method.

2. Description of Related Art

A brushless polyphase electric motor (hereinafter, simply referred to as a brushless motor) is known as a motor having no brush and no commutator. Unlike a brush motor, in which brushes slidably engage a commutator, the brushless motor does not substantially have a frictional wearing and is thereby suitable for a long term use. Therefore, the brushless motor is widely used as a drive motor, which is frequently used and is disposed in an environment where a periodic maintenance work is not performed or is difficult to perform.

In this brushless motor, the voltage is sequentially applied to windings of multiple phases on a phase-by-phase basis (i.e., applying the voltage to the windings of one phase and then applying the voltage to the windings of a next phase, and so on) to sequentially flow the current through the windings of the multiple phases and thereby to generate a rotating magnetic field. In this way, a magnet rotor having permanent magnets is rotated by the rotating magnetic field.

In an ideal brushless motor, an induced voltage, which is generated in each of the windings upon the rotation of the magnet rotor, has a sine waveform. Therefore, when a voltage of a sine waveform is applied to each of the windings in conformity with the sine waveform of the induced voltage, it is possible to reduce the oscillations (vibrations) and noises at the brushless motor.

However, in a real brushless motor, a distortion may occur in the waveform of the induced voltage, which is generated in each of the windings, due to magnetic saturation when an electric current flows under application of a load. Also, a distortion may occur in the waveform when harmonic components of the induced voltages are overlapped in an interior permanent magnet (IPM) motor, in which permanent magnets are embedded in a rotor. Furthermore, a distortion may occur in the waveform of the induced voltage due to a fluctuation in the load of the motor. Therefore, in the brushless motor, when an electric current is supplied to the windings based on the induced voltage, a periodic oscillation may possibly be generated due to a torque ripple, a cogging and/or a load fluctuation in response to the distortion component of the induced voltage.

WO 2005/035333 (corresponding to U.S. Pat. No. 7,474,067) recites a motor control apparatus, which reduces generation of the cogging and the torque ripple. In this motor control apparatus, a sine waveform of an induced voltage, which is generated in each of the windings, is coordinate transformed into a dq coordinate system. Then, the torque ripple or cogging, which is generated due to the presence of the harmonic component contained in the sine waveform after the coordinate transformation, is computed. Thereafter, a harmonic current command value (a command value, i.e., a specified value of the harmonic current), which causes generation of a torque that has a phase opposite to a phase of the computed torque ripple or cogging torque, is computed. Then, the voltage, which is applied to the respective windings, is controlled based on the harmonic current command value to reduce the torque ripple.

Furthermore, a resonance may occur in the motor at a specific frequency due to, for example, a structural factor. Thereby, even when the technique of WO 2005/035333 (corresponding to U.S. Pat. No. 7,474,067) is used, the resonance may possibly be generated in the motor at a specific frequency to cause generation of the resonance or noise.

SUMMARY OF THE INVENTION

The present invention addresses the above disadvantages. According to the present invention, there is provided a motor control apparatus for a polyphase electric motor that includes a rotor, which has a plurality of permanent magnets, and a stator core, which has a plurality of teeth and a plurality of windings. Each of the plurality of windings is provided for a corresponding one of a plurality of phases and is wound around each corresponding one of the plurality of teeth. The motor control apparatus includes a voltage applying means, a rotational speed sensing means, an obtaining means, a determining means and a correcting means. The voltage applying means is for sequentially applying a voltage to the plurality of windings on a phase-by-phase basis. The rotational speed sensing means is for sensing a rotational speed of the rotor, which is rotated by a rotating magnetic field that is generated by sequentially flowing an electric current in the plurality of windings on the phase-by-phase basis upon application of the voltage from the voltage applying means to the plurality of windings. The obtaining means is for obtaining an oscillation frequency of a periodic oscillation, which is generated in the polyphase electric motor at the rotational speed that is sensed with the rotational speed sensing means. The determining means is for determining whether the oscillation frequency, which is obtained with the obtaining means, is a predetermined resonance frequency. The correcting means is for correcting the voltage, which is applied from the voltage applying means to the plurality of windings, in a manner that reduces a resonance generated in the polyphase electric motor when the determining means determines that the oscillation frequency, which is obtained with the obtaining means, is the predetermined resonance frequency.

According to the present invention, there is also provided a motor control method for a polyphase electric motor that includes a rotor, which has a plurality of permanent magnets, and a stator core, which has a plurality of teeth and a plurality of windings. Each of the plurality of windings is provided for a corresponding one of a plurality of phases and is wound around each corresponding one of the plurality of teeth. According to the motor control method, a voltage is sequentially applied to the plurality of windings on a phase-by-phase basis. Then, there is sensed a rotational speed of the rotor, which is rotated by a rotating magnetic field that is generated by sequentially flowing an electric current in the plurality of windings on the phase-by-phase basis upon the sequential application of the voltage to the plurality of windings. Then, an oscillation frequency of a periodic oscillation, which is generated in the polyphase electric motor at the sensed rotational speed of the rotor, is obtained. Thereafter, it is determined whether the obtained oscillation frequency is a predetermined resonance frequency. Next, the voltage to be applied to the plurality of windings is corrected in a manner that reduces a resonance generated in the polyphase electric motor when a result of the determination indicates that the obtained oscillation frequency is the predetermined resonance frequency.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

An embodiment of the present invention will be described with reference to the accompanying drawings.

Figure 1A:
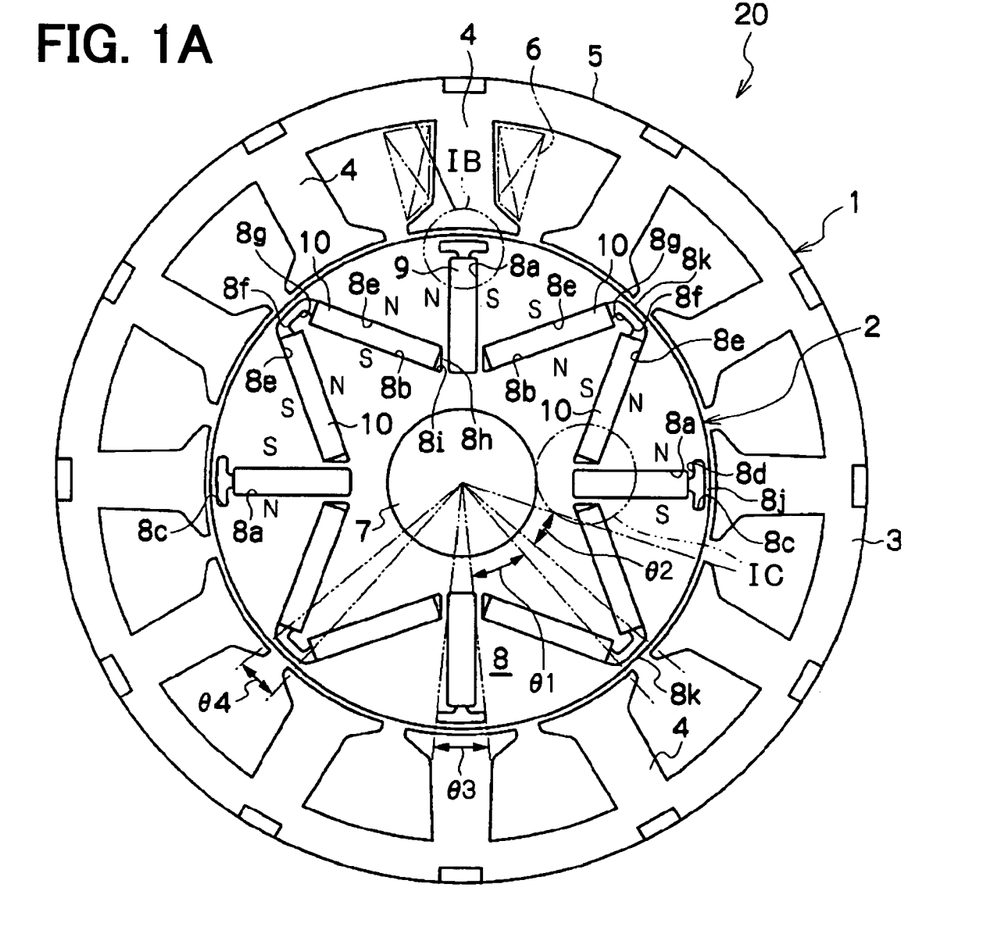
FIG. 1A is a plan view showing a stator and a rotor of an internal permanent magnet motor according to an embodiment of the present invention.
Figure 1B:
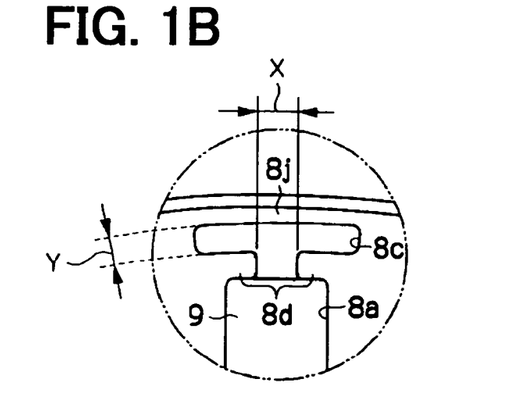
FIG. 1B is a partial enlarged view of a circle IB in FIG. 1A.
Figure 1C:
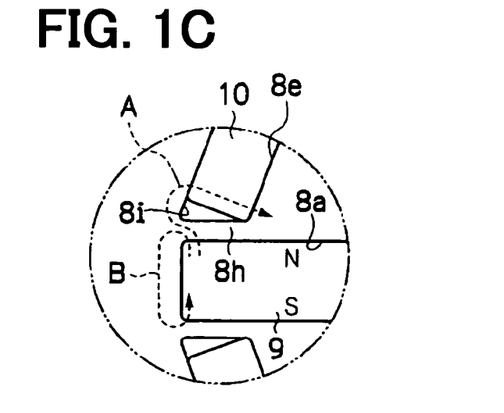
FIG. 1C is a partial enlarged view of a circle IC in FIG. 1A.
Figure 2:
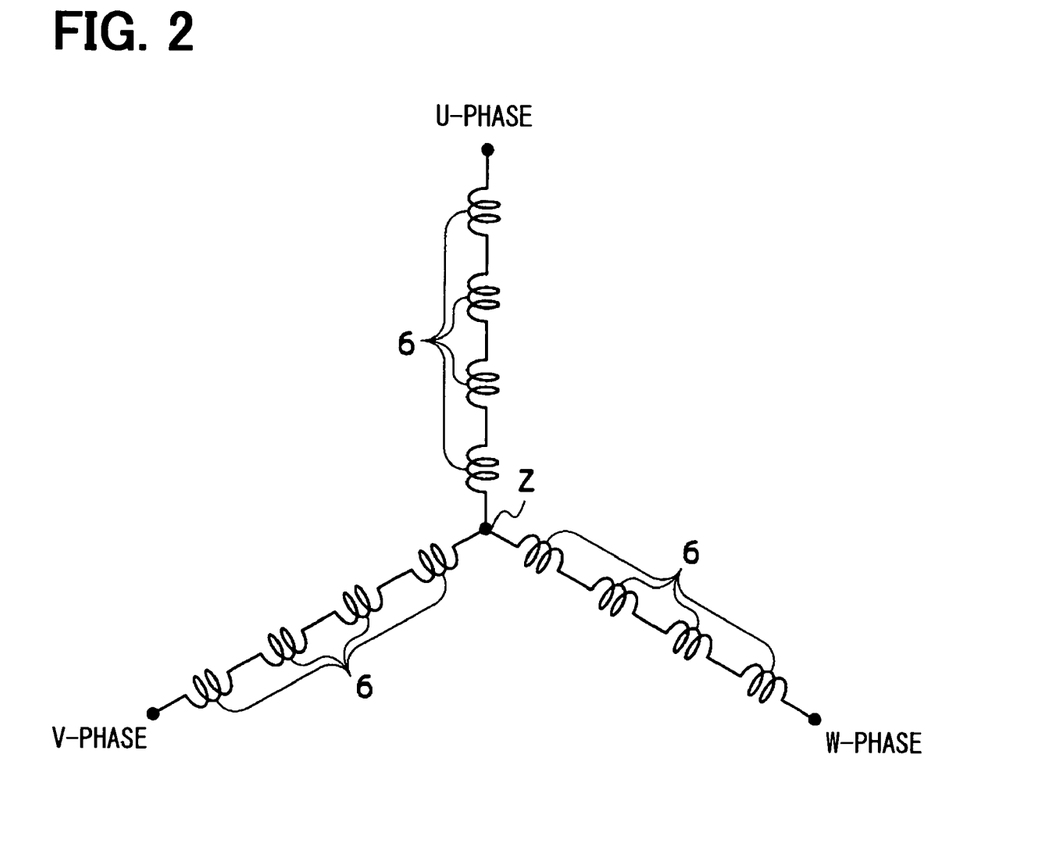
FIG. 2 is a diagram showing a connection of windings according to the embodiment.

FIGS. 1A to 2 show a polyphase electric motor (hereinafter, simply referred to as a motor) 20 of the present embodiment.

As shown in FIG. 1A, the motor 20 includes a stator 1 and a rotor 2.

The stator 1 includes a stator core 5 and windings 6. The stator core 5 is configured as a generally cylindrical body and includes a cylindrical portion 3 and a plurality of teeth 4. The teeth 4 extend radially inwardly from an inner peripheral surface of the cylindrical portion 3, which defines an outer shape of the stator 1. The teeth 4 are arranged one after another at generally equal angular intervals in a circumferential direction. The windings 6 are wound around the teeth 4 in a concentrated winding pattern through an insulator (not shown). In FIG. 1A, only one of the windings 6, which is wound around one of the teeth 4, is indicated with a dot-dot-dash line. In the present embodiment, the number of the teeth 4 is twelve. As shown in FIG. 2, the windings 6, which are wound around the teeth 4, are grouped into the windings 6 of a U-phase, the windings 6 of a V-phase and the windings 6 of a W-phase. Four of the teeth 4, around which the windings 6 of the U-phase are wound, four of the teeth 4, around which the windings 6 of the V-phase are wound, and four of the teeth 4, around which the windings 6 of the W-phase are wound, are arranged one after another in the circumferential direction. Therefore, each two of the four teeth 4, around which the windings 6 of the same phase (the common phase) are wound, are circumferentially spaced by other two of the teeth 4, around which the windings of the other phases, are respectively wound. The windings 6 of the same phase (the U-phase, V-phase or W-phase) are connected in series. One end of the windings 6 of the same phase is connected to a neutral point Z, and the other end of the windings 6 of the same phase is supplied with an alternate current, which is phase shifted by 120 degrees between each two of the U-phase, V-phase and W-phase.

The rotor 2 includes a rotatable shaft 7, a rotor core 8 and magnets 9, 10. The rotor core 8 is fixed to the rotatable shaft 7 to rotate integrally therewith. The magnets 9, 10 are received in receiving holes (radial holes 8a and V-shaped receiving holes 8b), which are formed in the rotor core 8. The total number (predetermined number) of the magnetic poles formed by the magnets 9, 10 in the rotor 2 is denoted as P (i.e., P poles). In this particular instance, the total number of the magnetic poles is eight (i.e., eight poles).

The rotor core 8 is a laminated core that includes a plurality of core sheets, which are stacked one after another in an axial direction of the rotor core 8 to form a generally cylindrical body. The rotatable shaft 7 is press fitted into a center hole of the rotor core 8 that is in turn rotatably placed radially inward of the stator 1. The receiving holes, which extend through the rotor core 8 in the axial direction to receive the magnets 9, 10, include the radial receiving holes 8a and the V-shaped receiving holes 8b. Each radial receiving hole 8a generally linearly extends toward an outer peripheral surface of the rotor core 8 in a radial direction of the rotor core 8 in an imaginary plane (a plane of FIG. 1A in this embodiment), which is perpendicular to the rotational axis of the rotor core 8. Each V-shaped receiving hole 8b is configured into a generally V-shape with an apex portion of the V-shape directed toward the outer peripheral surface of the rotor core 8 in the radial direction in the plane of FIG. 1A. The number of the radial receiving holes 8a is denoted as P/2 and is 8/2 (i.e., four) in this embodiment, and the number of the V-shaped receiving holes 8b is denoted as P/2 and is 8/2 (i.e., four) in this embodiment. The radial receiving holes 8a and the V-shaped receiving holes 8b are alternately arranged one after another in the circumferential direction at generally equal angular intervals.

A large width portion 8c is formed at a radially outer end of each radial receiving hole 8a and has a circumferential width (i.e., a width measured in a direction generally perpendicular to the radial direction of the rotor core 8 in the plane of FIG. 1A), which is larger than a circumferential width of the rest of the radial receiving hole 8a, as indicated in FIG. 1B. The large width portion 8c of the present embodiment extends through the rotor core 8 in the axial direction. Furthermore, at each radial receiving hole 8a, two circumferentially opposed projections 8d, which are circumferentially opposed to each other, are provided to form a neck portion of the radial receiving hole 8a, which has a circumferential width (i.e., a width measured in the direction generally perpendicular to the radial direction of the rotor core 8 in the plane of FIG. 1A) that is smaller than that of the rest of radial receiving hole 8a, at a location that is adjacent to the large width portion 8c and is radially inward of the large width portion 8c. In this way, a radially outward movement of the magnet 9 in the radial receiving hole 8a is limited by the circumferentially opposed projections 8d. The projecting lengths of these two circumferentially opposed projections 8d are generally equal to each other. Furthermore, a circumferential gap X (i.e., a gap in the direction generally perpendicular to the radial direction of the rotor core 8 in the plane of FIG. 1A) between these two circumferentially opposed projections 8d is set to be larger than a radial width Y of the large width portion 8c.

Each V-shaped receiving hole 8b has a pair of magnet receiving sections 8e and an apex portion 8f. The magnet receiving sections 8e generally linearly extend toward the outer peripheral surface of the rotor core 8 in the plane of FIG. 1A in such a manner that the magnet receiving sections 8e converge at the apex portion 8f located adjacent to the outer peripheral surface of the rotor core 8 to form the V-shape in the plane of FIG. 1A, and thereby the apex portion 9f connects between radially outer ends of the magnet receiving sections 8e. At each V-shaped receiving hole 8b, a projection 8g is provided to circumferentially project at a location, which is radially outward of the magnet receiving sections 8e, to reduce a circumferential width of each magnet receiving section 8e (i.e., a width measured in the direction generally perpendicular to the radial direction of the rotor core 8 in the plane of FIG. 1A) and thereby to limit a radially outward movement of the magnet 10 received in the adjacent magnet receiving section 8e. A width of the magnet receiving section 8e, which is measured in the direction generally perpendicular to the lengthwise direction (the elongating direction) of the magnet receiving section 8e, is generally constant along the length of the magnet receiving section 8e. In the present embodiment, an angle (the angle of the V), which is defined between the magnet receiving sections 8e of each V-shaped receiving hole 8b, is set to be about 50 degrees. Furthermore, a circumferential angular distance θ1 between the radially outer end portion (i.e., the large width portion 8c) of the radial receiving hole 8a and the radially outer end portion (i.e., the apex portion 8f) of its circumferentially adjacent V-shaped receiving hole 8b is set to be larger than a circumferential angular width θ2 of each tooth 4. A circumferential angular extent θ3 of the radially outer end portion (i.e., the large width portion 8c) of each radial receiving hole 8a is set to be generally the same as a circumferential angular extent θ4 of the radially outer end portion (i.e., the apex portion 8f) of each V-shaped receiving hole 8b. Furthermore, the circumferential angular extent θ3 of the radially outer end portion (i.e., the large width portion 8c) of the radial receiving hole 8a is set to be smaller than the circumferential angular width θ2 of each tooth 4.

A radially inner end portion of each of the magnet receiving sections 8e of each V-shaped receiving hole 8b is configured to have an inner wall surface that is generally parallel to an adjacent lateral inner wall surface of its circumferentially adjacent radial receiving hole 8a in the plane of FIG. 1A (see FIG. 1C). Each inner bridge 8h, which is formed between the radially inner end portion of the magnet receiving section 8e and its adjacent radial receiving hole 8a, has a generally constant width, which is measured in a direction perpendicular to the radial direction, along a radial length of the inner bridge 8h in the plane of FIG. 1A. This is made possible by an extended segment 8i, which is formed at the radially inner end portion of the magnet receiving section 8e and is configured into a generally triangular shape in the plane of FIG. 1A. Furthermore, the lengthwise direction of the magnet receiving portion 8e is tilted about 70 degrees from the lengthwise direction of its adjacent radial receiving hole 8a. Also, in the rotor core 8, an outer bridge 8j is formed between the radially outer end portion (the large width portion 8c) of each radial receiving hole 8a and the outer peripheral surface of the rotor core 8, and an outer bridge 8k is formed between the radially outer end portion (the apex portion 8f) of the magnet receiving sections 8e of each V-shaped receiving hole 8b and the outer peripheral surface of the rotor core 8. A radial thickness of each outer bridge 8j, 8k is generally constant along the circumferential extent of the outer bridge 8j, 8k and is set to be generally the same for all of the outer bridges 8j, 8k. Since the circumferential angular extent θ3 is generally the same as the circumferential angular extent θ4, the circumferential extent of each outer bridge 8j is also generally the same as the circumferential extent of each outer bridge 8k. The magnets 9 are received in the radial receiving holes 8a, respectively, and the magnets 10 are received in the magnet receiving sections 8e, respectively.

Each of the magnets 9, 10 is configured into a generally rectangular parallelepiped form and is magnetized in a direction perpendicular to the direction of the elongation of the magnet 9, 10 in the plane of FIG. 1A. The magnet 9, which is received in one of the radial receiving holes 8a, and the magnet 10, which is received in the circumferentially adjacent magnet receiving section 8e that is located on one circumferential side of the one of the radial receiving holes 8a, form one type of magnetic pole (e.g., the S pole), and the magnet 9, which is received in the one of the radial receiving holes 8a, and the magnet 10, which is receiving in the other circumferentially adjacent magnet receiving section 8e that is located on the other circumferential side of the one of the radial receiving holes 8a, form the other type of magnetic pole (e.g., the N pole). In the present embodiment, the axial extent of each of the magnets 9, 10 is set to be generally the same as the axial extent of the rotor core 8.

As discussed above, in the motor 20 of the present embodiment, each magnet 9, which is received in the corresponding radial receiving hole 8a, forms the portion of the magnetic pole (the one type of magnetic pole of the rotor 2, such as the S pole) on the one circumferential side of the magnet 9 and also forms the portion of the other magnetic pole (the other type of magnetic pole of the rotor 2, such as the N pole) on the other circumferential side of the magnet 9. Therefore, each magnet 9, which is received in the corresponding radial receiving hole 8a, is commonly used to create the two magnetic poles. As a result, in the case where the total number of the magnetic poles is P, the total number of the magnets 9, 10 is P×(3/2), so that the total number of the magnets can be reduced in comparison to the previous type where the total number of the magnets is 2×P. In the present embodiment, the total number of the magnetic poles is eight, and the total number of the magnets 9, 10 is twelve.

The motor 20 of the present embodiment has a motor control apparatus (unit) 40, which controls the rotational speed of the rotor 2.

Figure 3:
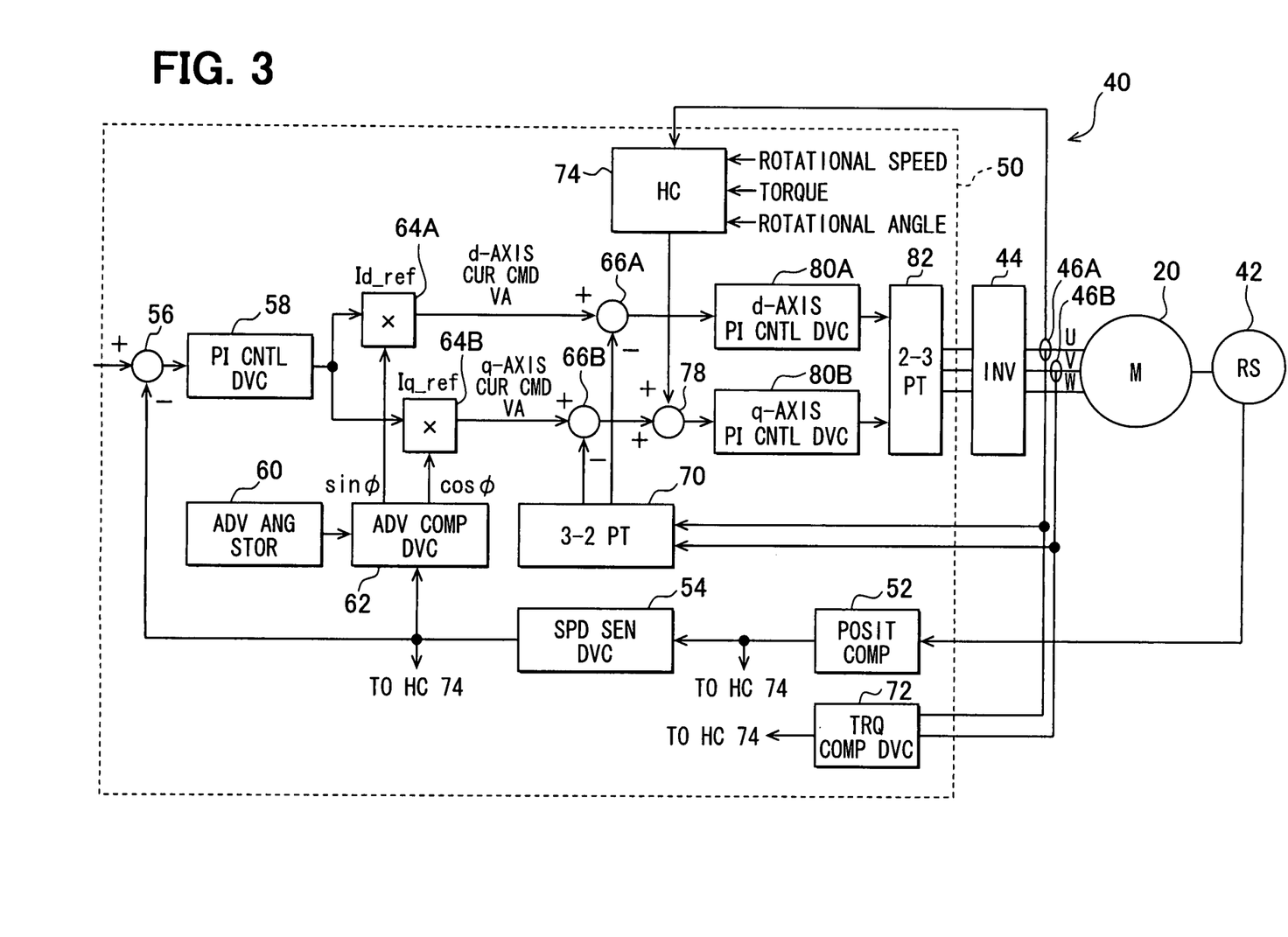
FIG. 3 is a block diagram showing a structure of a motor control apparatus according to the embodiment.

FIG. 3 shows a structure of the motor control apparatus 40 of the present embodiment.

The motor control apparatus 40 includes a rotation sensor (serving as a rotational speed sensing means) 42, a controller (serving as an obtaining means, a determining means, a correcting means, a voltage controlling means and an estimating means) 50, an inverter (serving as a voltage applying means) 44 and current sensors 46A, 46B. The rotation sensor 42 senses the rotational speed of the rotor 2. The controller 50 controls the rotational speed of the rotor 2 based on an output of the rotation sensor 42. The inverter 44 supplies the alternating current to the windings 6, which are grouped into the three phases (i.e., the U-phase, the V-phase and the W-phase), based on a command received from the controller 50 to rotate the rotor 2 of the motor 20. The current sensor 46A senses the actual current iu, which flows through the windings 6 of the U-phase. The current sensor 46V senses the actual current iv, which flows through the windings 6 of he V-phase.

The inverter 44 has electric power converting elements, such as field effect transistors (FETs) to execute a switching operation of a direct current voltage supplied from an undepicted direct current power source (e.g., a battery) according to each corresponding current command value (the command value of the current to be supplied) of the U-phase, the V-phase and the W-phase received from the controller 50, so that the inverter 44 sequentially applies the three phase alternating current voltages U, V, W to the windings of the three phases on the phase-by-phase basis.

The rotation sensor 42 is provided to the motor 20 and outputs a pulse signal to the controller 50 every time each corresponding one of the magnetic poles of the rotor 2 is sensed with a Hall IC of the rotation sensor 42.

The current sensor 46A senses the U-phase current iu of the motor 20 and outputs a signal indicating the U-phase current iu to the controller 50, and the current sensor 46B senses the V-phase current iv of the motor 20 and outputs a signal indicating the V-phase current iv to the controller 50.

The controller 50 is electrically connected to the rotation sensor 42, the current sensors 46A, 46B and an external device to receive the pulse signal of the rotation sensor 42, the U-phase and V-phase currents iu, iv of the current sensors 46A, 46B and a rotational speed command signal (indicating a target rotational speed of the rotor 2) of the external device. The controller 50 includes a central processing unit (CPU), a random access memory (RAM) and a read only memory (ROM) (the memories serving as storage devices). The controller 50 controls the supply (turning on and off) of the respective currents to the respective windings 6 and the amount of the respective currents supplied to the respective windings 6 through the inverter 44 based on the pulse signal of the rotation sensor 42, the signals of the current sensors 46A, 46B and the rotational speed command signal of the external device.

Specifically, the controller 50 senses the rotational angle $\theta$ of the rotor 2 by counting the number of the pulses of the pulse signal received from the rotation sensor 42 and senses the rotational speed of the rotor 2 by sensing the pulse width of the pulse signal or the number of the pulses of the pulse signal per unit time. The controller 50 compares the sensed rotational speed of the rotor 2 with the target rotational speed, which is indicated by the rotational speed command signal. Then, the controller 50 controls the currents supplied to the respective windings through the inverter 44 to coincide the sensed rotational speed of the rotor 2 with the target rotational speed by changing the actual rotational speed of the rotor 2.

FIG. 3 is a block diagram showing the operational flow of the controller 50 for controlling the rotational speed of the rotor 2.

As shown in FIG. 3, the controller 50 includes a position compensator 52, a speed sensing device 54, a subtracter 56, a PI control device 58, an advance angle value storage 60, an advance angle value computation device (advance angle value obtaining device) 62, multipliers 64A, 64B, subtracters 66A, 66B, a three-phase to two-phase transformer 70, a torque computation device (torque obtaining device) 72, a harmonic corrector 74, an adder 78, a d-axis PI control device 80A, a q-axis PI control device 80B and a two-phase to three-phase transformer 82.

A pulse signal, which is received from the rotation sensor 42, is supplied to the position compensator 52.

As discussed above, the rotation sensor 42 senses the magnetic poles of the rotor 2 with the Hall IC and outputs the corresponding pulse signal. Thus, for instance, in a case where the total number of the magnetic poles is four, only two pulses are outputted per rotation of the rotor 2. Therefore, in the case where the rotational angle of the rotor 2 is obtained under the assumption that the rotor 2 is rotated at a constant speed, an error may occur in the sensed rotational angle of the rotor 2 when the rotational speed is accelerated or decelerated.

Therefore, every time the pulse signal (pulse) is received, the position compensator 52 of the present embodiment measures an elapsed time period since the time of receiving the previous pulse signal, which is received immediately before the current pulse signal. The position compensator 52 obtains the rotational speed of the rotor 2 based on the elapsed time period. Then, the position compensator 52 compares the currently obtained rotational speed of the rotor 2 with the previously obtained rotational speed of the rotor 2, which is obtained immediately before the currently obtained rotational speed of the rotor 2, to obtain an acceleration in the rotational speed of the rotor 2 (i.e., a rate of change of the rotational speed of the rotor 2). Then, the position compensator 52 estimates the rotational angle $\theta$ of the rotor 2 under the assumption of that the rotor 2 is accelerated at the obtained acceleration until reception of the next pulse. In this way, the error in the sensed rotational angle $\theta$ of the rotor 2 is minimized. The position compensator 52 outputs the obtained rotational angle of the rotor 2 to the speed sensing device 54 and the harmonic corrector 74.

The speed sensing device 54 senses the rotational speed of the rotor 2 based on the amount of a change in the rotational angle $\theta$ of the rotor 2, which is estimated at the position compensator 52. Then, the speed sensing device 54 outputs the sensed rotational speed of the rotor 2 to the subtracter 56, the advance angle value computation device 62 and the harmonic corrector 74.

Besides the rotational speed of the rotor 2, which is obtained at the speed sensing device 54, the subtracter 56 also receives the rotational speed command signal from the external device.

The subtracter 56 subtracts the rotational speed of the rotor 2 from the target rotational speed, which is indicated in the rotational speed command signal, to obtain a deviation of the rotational speed of the rotor 2 relative to the target rotational speed. Then, the subtracter 56 outputs the deviation of the rotational speed to the PI control device 58.

The PI control device 58 executes a proportional value computation (P control) for processing the deviation of the rotational speed of the rotor 2 previously obtained at the subtracter 56 as well as an integral value computation (I control) for time-integrating the deviation. Then, a sum of a proportional value, which is obtained in the proportional value computation, and an integral value, which is obtained in the integral value computation, is multiplied by a predetermined gain coefficient in the PI control device 58. Thereafter, a resultant value, which is obtained by this multiplication, is outputted from the PI control device 58 to the multipliers 64A, 64B as a current command value (a command value of the current to be supplied).

The advance angle value storage 60 stores advance angle value information, which indicates an advance angle value $\phi$, which enables the most efficient rotation of the rotor 2 based on the rotational speed of the rotor 2. The advance angle value information may be stored in a form of a table showing the advance angle corresponding to the rotational speed of the rotor 2. Alternatively, the advance angle value information may be a function, in which the rotational speed serves as an input parameter, and the advance angle value serves as an output parameter.

The advance angle value computation device 62 obtains the advance angle value $\phi$, which corresponds to the rotational speed of the rotor 2, based on the advance angle value information stored in the advance angle value storage 60. The advance angle value computation device 62 obtains a value of sin $\phi$ of the obtained advance angle value $\phi$ and a value of cos $\phi$ of the obtained advance angle value $\phi$. Then, the advance angle value computation device 62 outputs the value of sin $\phi$ to the multiplier 64A and also outputs the value of cos $\phi$ to the multiplier 64B.

The multiplier 64A outputs a value, which is obtained by multiplying the current command value supplied thereto by the value of sin $\phi$, to the subtracter 66A as a d-axis current command value id_ref. In contrast, the multiplier 64B outputs a value, which is obtained by multiplying the current command value supplied thereto by the value of cos φ, to the subtracter 66B as a q-axis current command value iq_ref.

The signals, which are outputted from the current sensors 46A, 46B, are provided to the three-phase to two-phase transformer 70 and the torque computation device 72. At least one of the signals, which are outputted from the current sensors 46A, 46B, respectively, is supplied to the harmonic corrector 74. In this instance, the signal, which is outputted from the current sensor 46A, is supplied to the harmonic corrector 74.

The three-phase to two-phase transformer 70 executes the three-phase to two-phase coordinate transformation of the phase current iu of the U-phase and the phase current iv of the V-phase of the motor 20, which are sensed with the current sensors 46A, 46B, so that these phase currents iu, iv are divided, i.e. are split into a d-axis current, which corresponds to a magnetizing current, and a q-axis current, which corresponds to the torque generating current. Then, the three-phase to two-phase transformer 70 outputs the d-axis current to the subtracter 66A and also outputs the q-axis current to the subtracter 66B.

The torque computation device 72 obtains the torque, which causes the rotation of the rotor 2, based on the phase current iu of the U-phase and the phase current iv of the V-phase of the motor 20, which are sensed with the current sensors 46A, 46B, and the torque constant of the motor 20. Then, the torque computation device 72 outputs the obtained torque to the to the harmonic corrector 74.

Figure 4:
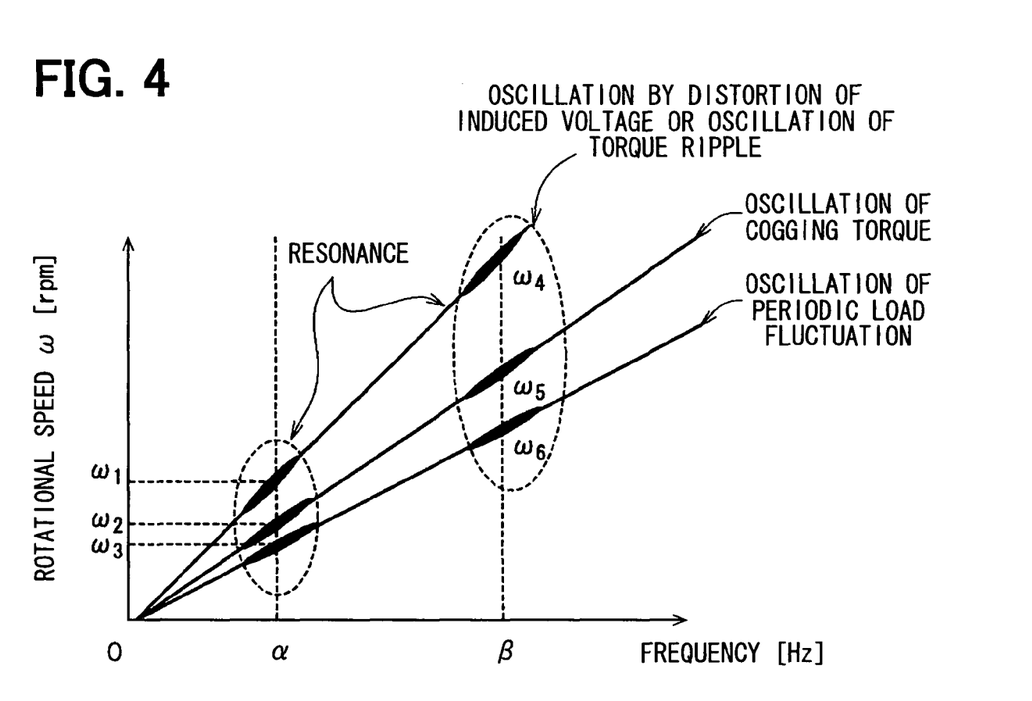
FIG. 4 is a diagram showing oscillation frequencies and resonance frequencies, which change in response to a rotational speed of the motor according to the embodiment.

As shown in FIG. 4, in the motor 20, the oscillation frequency of the oscillation, which is generated by the torque ripple, the cogging, or the load change (load fluctuation), is changed depending on the torque and the rotational speed of the rotor 2.

In the motor 20 of the present embodiment, the oscillation, which is caused by the harmonic distortion of the induced voltage, may be generated at a frequency obtained by the following equation. For instance, in the following equation, as well as other subsequent equations, the frequency may possibly be indicated in the unit of Hz, and the rotational speed ω of the rotor 2 may possibly be indicated in the unit of revolutions per second (rps).

Frequency of Oscillation=Order of Harmonic after Three-Phase to Two-phase transformation× (Number P of magnetic Poles/2)×Rotational Speed ω of Rotor The motor 20 may generate the fifth, seventh, eleventh and/or thirteenth harmonic. As discussed above, in the case of the rotor 2 of the present embodiment, the number of the magnetic poles is denoted as P, and the radial receiving holes 8a (the number of the radial receiving holes 8a being denoted as P/2), each of which receives the corresponding one of the magnets 9, and the V-shaped receiving holes 8b (the number of the V-shaped receiving holes 8b being denoted as P/2), each of which receives the corresponding two of the magnets 10 in the magnet receiving sections 8e, respectively, are alternately arranged one after another in the circumferential direction. In such a case, the eleventh harmonic and the thirteenth harmonic are effectively reduced among the harmonics that are generated at the corresponding periods, respectively, each of which is equal to the integral multiple of the period of rotating the rotor 2 through one rotation (one revolution). Therefore, when the fifth harmonic and the seventh harmonic can be reduced, it is possible to limit the resonance. When the fifth and seventh harmonics are transformed through the three-phase to two-phase transformation, the fifth and seventh harmonics become the sixth harmonic. Therefore, the oscillation, which is caused by the sixth harmonic, and the oscillation, which is caused by the torque ripple, may be generated at the frequency, which is obtained by the following equation.

Frequency of Oscillation=3×Number P of Magnetic Poles of Rotor×Rotational Speed ω of Rotor The oscillation, which is caused by the cogging torque, may be generated at the frequency, which is obtained by the following equation.

Frequency of Oscillation=Lowest Common Multiple (LCM) of Number P of Magnetic Poles of Rotor and Number S of Slots of Stator 1×Rotational Speed ω of Rotor Furthermore, the oscillation, which is caused by the load fluctuation of the motor 20, may occur at a frequency that is obtained by the following equation.

Frequency of Oscillation=Frequency L of Load Fluctuation per Rotation of Rotor×Rotational Speed ω of Rotor The frequency L of the load fluctuation per rotation of the rotor can be preset through, for example, computer simulation according to the experiments using a real motor and/or the design specification of the motor.

Furthermore, in the motor 20, a resonance may be generated at a specific frequency due to the structure of the motor 20 and/or the structure of the device, to which the motor 20 is installed. Resonance frequencies α, β, at each of which the resonance occurs, may be obtained through, for example, the computer simulation according to the experiments using the real motor and/or the design specification of the motor.

The harmonic corrector 74 obtains the oscillation frequency of the periodic oscillation, which is caused by the torque ripple, the cogging or the load fluctuation at the rotational speed that is obtained at the speed sensing device 54.

The harmonic corrector 74 determines whether the obtained oscillation frequency is one of the resonance frequency α, which causes generation of the resonance at the motor 20, and the resonance frequency β, which causes generation of the resonance at the device, to which the motor 20 is installed. Then, when it is determined that the obtained oscillation frequency is one of the resonance frequencies α, β, the harmonic corrector 74 obtains a correction value for correcting the q-axis current in a manner that reduces the resonance. Thereafter, the harmonic corrector 74 outputs the correction value to the adder 78.

Furthermore, even in a non-energized state of the motor 20 or in a state where a minute current is supplied to the motor 20, the cogging may be generated. In view of this cogging, the harmonic corrector 74 also obtains a correction value for correcting the q-axis current according to the rotational angle of the rotor 2 in the case where the phase current iu, which flows through the U-phase winding 6 of the motor 20 and is determined according to the signal supplied from the current sensor 46A, is smaller than a predetermined value, which is defined as a current that would be measured in the non-energized state of the motor 20 or in the state where the minute current is supplied to the motor 20. Then, the harmonic corrector 74 outputs this correction value to the adder 78.

The subtracter 66A subtracts the d-axis current from the d-axis current command value id_ref to obtain the deviation of the d-axis current from the d-axis current command value id_ref. Then, the subtracter 66A outputs this deviation of the d-axis current to the d-axis PI control device 80A.

The d-axis PI control device 80A executes a proportional value computation for processing the deviation of the d-axis current obtained at the subtracter 66A as well as an integral value computation for time-integrating the deviation. Then, a sum of a proportional value, which is obtained in the proportional value computation, and an integral value, which is obtained in the integral value computation, is multiplied by a predetermined gain coefficient in the d-axis PI control device 80A. Thereafter, a resultant value, which is obtained by this multiplication, is outputted from the d-axis PI control device 80A to the two-phase to three-phase transformer 82 as a d-axis current command value.

In contrast, the subtracter 66B subtracts the q-axis current from the q-axis current command value iq_ref to obtain the deviation of the q-axis current from the q-axis current command value iq_ref. Then, the subtracter 66B outputs this deviation of the q-axis current to the adder 78.

The adder 78 corrects the deviation of the q-axis current by adding the correction value, which is outputted from the harmonic corrector 74, to the deviation of the q-axis current. Then, the adder 78 outputs the corrected deviation to the q-axis PI control device 80B.

The q-axis PI control device 80B executes a proportional value computation for processing the deviation of the q-axis current corrected at the adder 78 as well as an integral value computation for time-integrating the deviation. Then, a sum of a proportional value, which is obtained in the proportional value computation, and an integral value, which is obtained in the integral value computation, is multiplied by a predetermined gain coefficient in the q-axis PI control device 80B. Thereafter, a resultant value, which is obtained by this multiplication, is outputted from the q-axis PI control device 80B to the two-phase to three-phase transformer 82 as a q-axis current command value.

The two-phase to three-phase transformer 82 executes two-phase to three-phase coordinate transformation of the d-axis current command value, which is obtained at the d-axis PI control device 80A, and two-phase to three-phase coordinate transformation of the q-axis current command value, which is obtained at the q-axis PI control device 80B. Then, the two-phase to three-phase transformer 82 outputs the corresponding current command value of each of the U-phase, the V-phase and the W-phase to the inverter 44.

Next, the operation of the motor control apparatus 40 of the present embodiment will be described.

In the motor 20, when the controller 50 is operated to supply the three-phase voltages U, V, W from the inverter 44 to the windings 6 of the U-phase, the V-phase and the W-phase, respectively, to generate the rotating magnetic field, the rotor 2 is rotated.

When the rotor 2 is rotated, the rotation sensor 42 outputs the pulse signal at the corresponding period (pulse period), which corresponds to the rotational speed of the rotor 2 every time the magnetic pole of the rotor 2 is sensed. The pulse signal, which is outputted from the rotation sensor 42, is supplied to the position compensator 52 of the controller 50.

The position compensator 52 obtains the rotational speed of the rotor 2 based on the elapsed time period since time of receiving the previous pulse signal, which is received immediately before the current pulse signal. Then, the position compensator 52 compares the currently obtained rotational speed of the rotor 2 with the previously obtained rotational speed of the rotor 2, which is obtained immediately before the currently obtained rotational speed of the rotor 2, to obtain an acceleration in the rotational speed of the rotor 2. Then, the position compensator 52 estimates the rotational angle $\theta$ of the rotor 2 (a rotational angle of the rotor 2, through which the rotor 2 is rotated in the time interval between two consecutive occurrences of outputting of the pulse signal, i.e., the amount of a change in the rotational angle of the rotor 2 in the time interval between two consecutive occurrences of outputting of the pulse signal) under the assumption of that the rotor 2 is accelerated at the obtained acceleration until reception of the next pulse. The speed sensing device 54 senses the rotational speed of the rotor 2 based on the change in the rotational angle $\theta$ of the rotor 2, which is estimated at the position compensator 52.

The torque computation device 72 obtains the torque, which causes the rotation of the rotor 2, based on the phase current iu of the U-phase and the phase current iv of the V-phase of the motor 20, which are sensed with the current sensors 46A, 46B, and the torque constant of the motor 20. The torque computation device 72 also executes the three-phase to two-phase coordinate transformation of the phase current iu of the U-phase and the phase current iv of the V-phase of the motor 20 to sense the d-axis current and the q-axis current.

The subtracter 56 subtracts the rotational speed of the rotor 2 from the target rotational speed, which is indicated in the rotational speed command signal, to obtain the deviation of the rotational speed of the rotor 2 relative to the target rotational speed. The PI control device 58 executes the PI control of the deviation of the rotational speed to obtain the current command value. The advance angle value computation device 62 obtains the advance angle value $\phi$, which corresponds to the rotational speed of the rotor 2, for the current command value. Then, the multiplier 64A obtains the d-axis current command value id_ref by multiplying the current command value by the value of $\sin\phi$. Also, the multiplier 64B obtains the q-axis current command value iq_ref by multiplying the current command value by the value of $\cos\phi$.

The three-phase to two-phase transformer 70 executes the three-phase to two-phase coordinate transformation of the phase current iu of the U-phase and the phase current iv of the V-phase of the motor 20, which are sensed with the current sensors 46A, 46B, to obtain the d-axis current and the q-axis current, which actually flow.

The subtracter 66A compares the d-axis current, which actually flows, with the d-axis current command value id_ref to obtain the deviation of the d-axis current. Also, the subtracter 66B compares the q-axis current, which actually flows, with the q-axis current command value iq_ref to obtain the deviation of the q-axis current.

At this time, the harmonic corrector 74 executes a correction operation, which will be described latter, to obtain the correction value for correcting the q-axis current.

Figure 5:
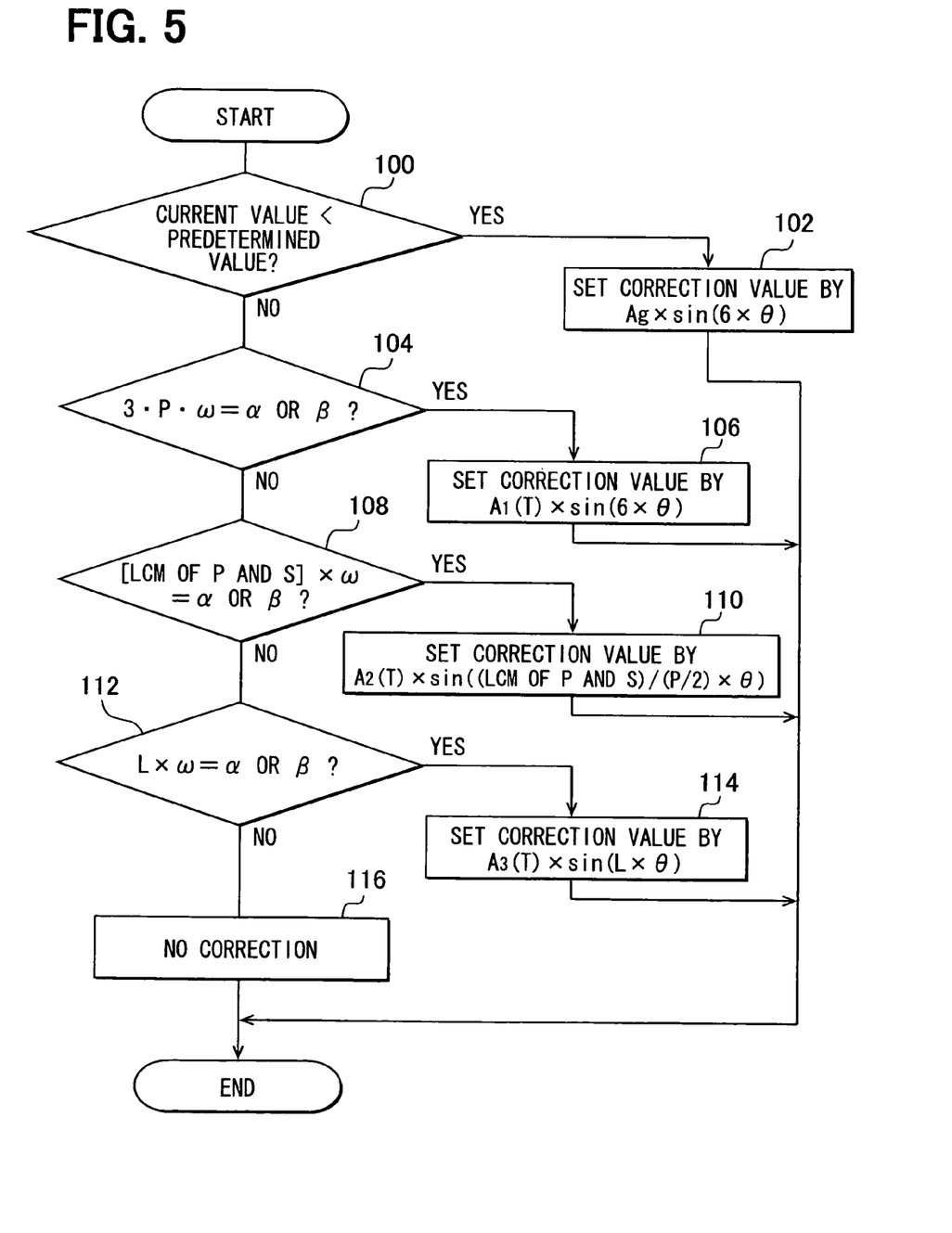
FIG. 5 is flowchart showing a correction operation according to the embodiment.

FIG. 5 is a flowchart showing the flow of the correction operation, which is executed by the harmonic corrector 74 according to the present embodiment.

At step 100, it is determined whether the phase current iu, which flows through the U-phase winding 6 of the motor 20 and is determined according to the signal supplied from the current sensor 46A, is smaller than the predetermined value. When it is determined that the phase current iu is smaller than the predetermined value at step 100 (i.e., YES at step 100), the operation proceeds to step 102. In contrast, when it is determined that the phase current iu is not smaller than the predetermined value at step 100 (i.e., NO at step 100), the operation proceeds to step 104.

At step 102, the correction value for correcting the q-axis current to cancel the oscillation is computed by $Ag \times \sin(6 \times \theta)$. In this equation "Ag" denotes a coefficient, which is defined according to the cogging that is generated in the case where the motor 20 is in the non-energized state or in the state where the minute current is supplied to the motor 20. Furthermore, "Ag" is preset through, for example, computer simulation according to experiments using a real motor and/or the design specification of the motor.

At step 104, the frequency of the above-discussed oscillation (caused by the sixth harmonic and/or the torque ripple) is obtained by the equation of 3×Number P of Magnetic Poles of Rotor×Rotational Speed $\omega$ of Rotor (=3×P×$\omega$). Then, it is determined whether the computed (obtained) frequency of the oscillation is one of the resonance frequencies $\alpha$, $\beta$. When it is determined that the computed frequency of the oscillation is one of the resonance frequencies $\alpha$, $\beta$ at step 104 (i.e., YES at step 104), the operation proceeds to step 106. In contrast, when it is determined that the computed frequency of the oscillation is not one of the resonance frequencies $\alpha$, $\beta$ at step 104 (i.e., NO at step 104), the operation proceeds to step 108.

At step 106, the correction value for correcting the q-axis current to cancel the oscillation is computed by $A_1(T)\times\sin(6\times\theta)$. Then, the operation is terminated. In this equation, "$A_1(T)$" denotes a function, which defines the coefficient according to the torque T. Furthermore, "$A_1(T)$" is preset through, for example, computer simulation according to experiments using a real motor and/or the design specification of the motor.

At step 108, the frequency of the above-discussed oscillation (caused by the cogging torque) is obtained by the equation of Lowest Common Multiple of Number P of Magnetic Poles of Rotor and Number S of Slots of Stator 1×Rotational Speed $\omega$ of Rotor (=(LCM of P and S)×$\omega$). Then, it is determined whether the computed frequency of the oscillation is one of the resonance frequencies $\alpha$, $\beta$. When it is determined that the computed frequency of the oscillation is one of the resonance frequencies $\alpha$, $\beta$ at step 108 (i.e., YES at step 108), the operation proceeds to step 110. In contrast, when it is determined that the computed frequency of the oscillation is not one of the resonance frequencies $\alpha$, $\beta$ at step 108 (i.e., NO at step 108), the operation proceeds to step 112.

At step 110, the correction value for correcting the q-axis current to cancel the oscillation is computed by $A_2(T)\times\sin((LCM\ of\ P\ and\ S)/(P/2)\times\theta)$. Then, the operation is terminated. In this equation, "$A_2(T)$" denotes a function, which defines the coefficient according to the torque T. Furthermore, "$A_2(T)$" is preset through, for example, computer simulation according to experiments using a real motor and/or the design specification of the motor.

At step 112, the frequency of the above-discussed oscillation (caused by the load fluctuation) is obtained by the equation of Frequency L of Load Fluctuation per Rotation of Rotor×Rotational Speed $\omega$ of Rotor (=L×$\omega$). Then, it is determined whether the computed frequency of the oscillation is one of the resonance frequencies $\alpha$, $\beta$. When it is determined that the computed frequency of the oscillation is one of the resonance frequencies $\alpha$, $\beta$ at step 112 (i.e., YES at step 112), the operation proceeds to step 114. In contrast, when it is determined that the computed frequency of the oscillation is not one of the resonance frequencies $\alpha$, $\beta$ at step 112 (i.e., NO at step 112), the operation proceeds to step 116.

At step 114, the correction value for correcting the q-axis current to cancel the oscillation is computed by $A_3(T)\times\sin(L\times\theta)$. Then, the operation is terminated. In this equation, "$A_3(T)$" denotes a function, which defines the coefficient according to the torque T. Furthermore, "$A_3(T)$" is preset through, for example, computer simulation according to experiments using a real motor and/or the design specification of the motor.

In contrast, at step 116, no correction is applied (i.e., the correction value is set to be zero). Then, the operation is terminated.

In the above discussed correction operation, optionally, the rotational angle $\theta$, which is used at step 102, step 106, step 110 and step 114 to compute the corresponding correction value, may be corrected based on the rotational speed $\omega$ for the purpose of compensating a delay (e.g., a delay in the phase of the current) in the system, which controls the current discussed above.

The harmonic corrector 74 outputs the corresponding correction value, which is obtained in the correction operation described above, to the adder 78.

The adder 78 corrects the deviation of the q-axis current by adding the correction value, which is received from the harmonic corrector 74, to the deviation of the q-axis current. Then, the adder 78 outputs the corrected deviation to the q-axis PI control device 80B.

The d-axis PI control device 80A and the q-axis PI control device 80B execute the PI control of the deviation for the d-axis and the q-axis, respectively, to obtain the d-axis current command value and the q-axis current command value. The two-phase to three-phase transformer 82 executes the two-phase to three-phase coordinate transformation of the d-axis current command value and the two-phase to three-phase coordinate transformation of the q-axis current command value. Then, the two-phase to three-phase transformer 82 outputs the corresponding current command value of each of the U-phase, the V-phase and the W-phase to the inverter 44.

The inverter 44 executes the switching of the direct current voltage of the direct current power source (not shown), such as the battery, according to the current command values of the U-phase, the V-phase and the W-phase supplied from the two-phase to three-phase transformer 82, so that the inverter 44 sequentially supplies the three-phase alternating current voltages U, V, W to the windings 6 of the U-phase, the V-phase and the W-phase on the phase-by-phase basis. In this way, the rotating magnetic field is generated to rotate the rotor 2.

As described above, according to the present embodiment, the resonance may occur in the motor 20 depending on the rotational speed of the motor 20 (more specifically, the rotational speed of the rotor 2 of the motor 20). However, as in the case of the present embodiment, the rotational speed of the rotor 2 of the motor 20 is sensed, and the oscillation frequency of the periodic oscillation, which is generated in the motor 20 at the sensed rotational speed of the motor 20, is obtained. Then, it is determined whether the obtained oscillation frequency is the predetermined resonance frequency. When it is determined that the obtained oscillation frequency is the predetermined resonance frequency, the voltages, which are applied to the windings of the multiple phases, respectively, are corrected in a manner that reduces the resonance. Therefore, the generation of the resonance in the motor 20 can be limited.

Figure 6:
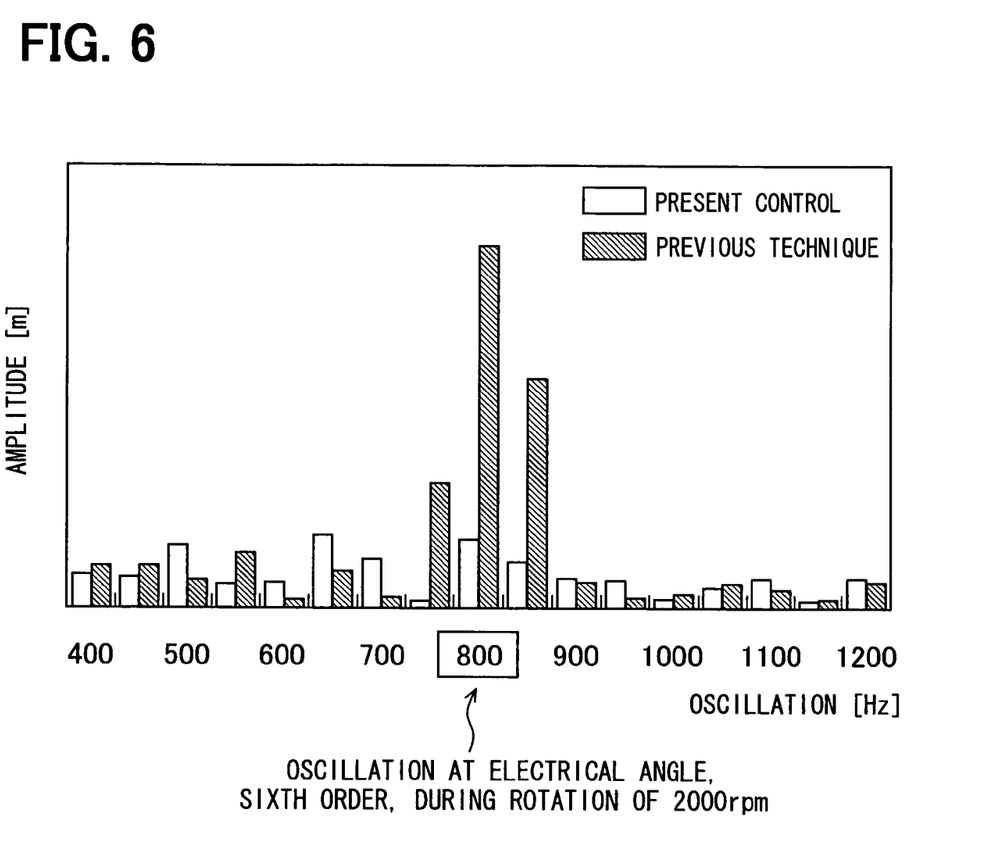
FIG. 6 is a diagram showing a torque ripple generated in the motor at various frequencies.

FIG. 6 shows the generation of the oscillation in the respective oscillation frequencies at the time of rotating the motor 20 at 2000 rpm for each of the case where the correction is not made (the previously proposed technique) and the case where the correction is made according to the present embodiment (the present control).

As shown in FIG. 6, in the case of the present embodiment (the present technique), the oscillation, which is caused by the resonance generated in the motor 20, is reduced in comparison to the previously proposed technique.

As in the case of the present embodiment where the current, which is supplied through the windings 6, is divided, i.e., is split into the d-axis current and the q-axis current, and the voltages applied to the windings are vector controlled, the q-axis current serves as the component that rotates the rotor 2. Therefore, when the deviation of the q-axis current is corrected, the generation of the torque ripple at the motor 20 can be reduced. The d-axis current is the component, which causes the radial oscillation of the stator 1, and the stator 1 may be radially flexed in the case where the radial rigidity of the stator 1 is low. The radial flexing of the stator 1 is sequentially shifted in the circumferential direction of the stator 1 to cause the oscillation of the stator 1. Therefore, the deviation of the d-axis current may be further corrected.

Furthermore, according to the present embodiment, in the case where the number of the magnetic poles is denoted as P, the radial receiving holes 8a (the number of the radial receiving holes 8a being denoted as P/2), each of which receives the corresponding one of the magnets 9, and the V-shaped receiving holes 8b (the number of the V-shaped receiving holes 8b being denoted as P/2), each of which receives the corresponding two of the magnets 10 in the magnet receiving sections 8e, respectively, are alternately arranged one after another in the circumferential direction. The motor 20 may generate the fifth, seventh, eleventh and/or thirteenth harmonic. However, when the motor 20 and the motor control apparatus 40 are constructed in the manner discussed in the present embodiment, it is possible to reduce the eleventh and thirteenth harmonics, each of which is generated at the corresponding period that is the integral multiple of the period for rotating the rotor 2 through one rotation (one revolution). Therefore, when the resonances of the fifth and seventh harmonics are limited by the correction operation of the present embodiment, it is possible to limit the generation of the oscillations of the motor 20.

Also, according to the present embodiment, it is not required to transform the harmonic currents in the dq coordinate system for the respective harmonic orders, and it is only required to execute the correction at each corresponding harmonic order, at which the resonance is generated, thereby resulting in the reduced amount of computations. As a result, an inexpensive computation device can be used for the controller 50.

In the present embodiment, the coefficient, which is used for the computation of the correction value, is set to be the function $(A_1(T), A_2(T), A_3(T))$ corresponding to the torque T. However, the present invention is not limited to this. For example, coefficients, which are set for the corresponding torques, respectively, may be stored as the torque information. Then, the corresponding coefficient, which corresponds to the subject torque T, may be retrieved from the coefficient information.

Furthermore, in the present embodiment, the rotation sensor 42 outputs the pulse signal every time the magnetic pole of the rotor 2 is sensed with the Hall IC. However, the present invention is not limited to this. For example, in place of the rotation sensor 42, it is possible to use a rotation sensor, which includes a code wheel and rotation sensing devices. In such a case, the code wheel has slits, which are arranged one after another in the circumferential direction and through which the light can pass through. The rotation sensing devices may be photo-interrupters. Further alternatively, various types of encoders, such as an electromagnetic encoder, a magneto-resistive encoder, may be used as the rotation sensor.

In the present embodiment, the acceleration in the rotational speed of the rotor 2 is obtained at the position compensator 52 through the comparison of the currently obtained rotational speed of the rotor 2 with the previously obtained rotational speed of the rotor 2. However, the present invention is not limited to this. For example, the acceleration in the rotational speed of the rotor 2 may be obtained based on a change in the current command value, which is obtained at the PI control device 58, or based on a change in the q-axis current command value, which is obtained at the q-axis PI control device 80B.

The structure (see FIGS. 1A to 2) of the motor 20, the structure (see FIG. 3) of the motor control apparatus 40 (including the controller 50) discussed in the above embodiment are mere illustrative and may be modified in any appropriate manner within a spirit and scope of the present invention.

Furthermore, the flow of the correction operation (see FIG. 5) is also mere illustrative and may be modified in any appropriate manner within a spirit and scope of the present invention.

What is claimed is:

1. A motor control apparatus for a polyphase electric motor that includes a rotor, which has a plurality of permanent magnets, and a stator core, which has a plurality of teeth and a plurality of windings, wherein each of the plurality of windings is provided for a corresponding one of a plurality of phases and is wound around each corresponding one of the plurality of teeth, the motor control apparatus comprising:
   a voltage applying device that sequentially applies a voltage to the plurality of windings on a phase-by-phase basis;
   a rotational speed sensing device that senses a rotational speed of the rotor, which is rotated by a rotating magnetic field that is generated by sequentially flowing an electric current in the plurality of windings on the phase-by-phase basis upon application of the voltage from the voltage applying device to the plurality of windings; and
   a controller that corrects the voltage, which is applied to the plurality of windings from the voltage applying device, to control the rotational speed of the rotor in a manner that reduces mechanical resonance generated in the polyphase electric motor when the controller determines that an oscillation frequency of periodic vibrations of the polyphase electric motor, which is obtained by the controller based on the rotational speed of the rotor sensed with the rotational speed sensing device, is a predetermined resonance frequency, wherein
   the controller corrects the voltage, which is applied to the plurality of windings from the voltage applying device, when the controller determines that the oscillation frequency of the periodic vibrations of the polyphase electric motor coincides with the predetermined resonance frequency, which is one of a plurality of predetermined resonance frequencies that are preset to be compared with the oscillation frequency of the periodic vibrations of the polyphase electric motor at the controller.

2. The motor control apparatus according to claim 1, wherein the controller controls the voltage, which is applied to the plurality of windings from the voltage applying device, by controlling a d-axis current, which corresponds to a magnetizing current, and a q-axis current, which corresponds to a torque generating current, upon splitting the electric current, which flows through the plurality of windings, into the d-axis current and the q-axis current, and the controller corrects the q-axis current in a manner that reduces the mechanical resonance.

3. The motor control apparatus according to claim 2, wherein the controller further corrects the d-axis current in a manner that reduces the periodic vibrations generated in the stator core, which is radially opposed to the rotor.

4. The motor control apparatus according to claim 1, wherein the controller controls the voltage, which is applied to the plurality of windings from the voltage applying device, by controlling a d-axis current, which corresponds to a magnetizing current, and a q-axis current, which corresponds to a torque generating current, upon splitting the electric current, which flows through the plurality of windings, into the d-axis current and the q-axis current, and the controller corrects the q-axis current based on a rotational angle of the rotor when the electric current, which flows in the plurality of windings, is smaller than a predetermined value.

5. The motor control apparatus according to claim 1, wherein:
the plurality of permanent magnets forms a predetermined number of magnetic poles;
the rotor includes a plurality of radial receiving holes, a number of which is one half of the predetermined number of the magnetic poles, and a plurality of V-shaped receiving holes, a number of which is one half of the predetermined number of the magnetic poles;
the plurality of radial receiving holes and the plurality of V-shaped receiving holes are alternately arranged one after another in a circumferential direction of the rotor;
each of the plurality of radial receiving holes receives a corresponding one of the plurality of permanent magnets and generally linearly extends toward an outer peripheral surface of the rotor in a radial direction of the rotor in an imaginary plane, which is perpendicular to a rotational axis of the rotor; and
each of the plurality of V-shaped receiving holes has a pair of magnet receiving sections, each of which receives a corresponding one of the plurality of permanent magnets and which generally linearly extend toward the outer peripheral surface of the rotor in the imaginary plane in such a manner that the magnet receiving sections converge at an apex portion located adjacent to the outer peripheral surface of the rotor to form a V-shape in the imaginary plane.

6. The motor control apparatus according to claim 1, wherein:
the rotational speed sensing device senses the rotational speed of the rotor based on a pulse signal outputted every time the rotor rotates a predetermined rotational angle; and
the controller estimates a rotational angle of the rotor in a time interval between two consecutive occurrences of outputting of the pulse signal based on an acceleration in the rotational speed of the rotor upon obtaining the acceleration.

7. The motor control apparatus according to claim 1, wherein the controller obtains the oscillation frequency of the periodic vibrations generated in the polyphase electric motor due to at least one of a torque ripple, a cogging and a load fluctuation.

8. The motor control apparatus according to claim 1, wherein the predetermined resonance frequency is at least one of a frequency of mechanical resonance generated in the polyphase electric motor and a frequency of mechanical resonance generated in a device, to which the polyphase electric motor is installed.

9. The motor control apparatus according to claim 1, wherein the oscillation frequency of periodic vibrations of the polyphase electric motor is obtained by the controller based on the rotational speed of the rotor sensed and estimated by the rotational speed sensing device, is a predetermined resonance frequency.

10. A motor control method for a polyphase electric motor that includes a rotor, which has a plurality of permanent magnets, and a stator core, which has a plurality of teeth and a plurality of windings, wherein each of the plurality of windings is provided for a corresponding one of a plurality of phases and is wound around each corresponding one of the plurality of teeth, the motor control method comprising:
sequentially applying a voltage to the plurality of windings on a phase-by-phase basis;
sensing a rotational speed of the rotor, which is rotated by a rotating magnetic field that is generated by sequentially flowing an electric current in the plurality of windings on the phase-by-phase basis upon the sequential application of the voltage to the plurality of windings;
obtaining an oscillation frequency of periodic vibrations of the polyphase electric motor based on the sensed rotational speed of the rotor;
determining whether the obtained oscillation frequency is a predetermined resonance frequency; and
correcting the voltage to be applied to the plurality of windings to control the rotational speed of the rotor in a manner that reduces mechanical resonance generated in the polyphase electric motor when a result of the determination indicates that the obtained oscillation frequency is the predetermined resonance frequency, wherein
the determining of whether the obtained oscillation frequency is the predetermined resonance frequency includes determining whether the obtained oscillation frequency is one of a plurality of predetermined resonance frequencies; and
the correcting of the voltage to be applied to the plurality of windings includes correcting the voltage to be applied to the plurality of windings to control the rotational speed of the rotor in the manner that reduces the mechanical resonance generated in the polyphase electric motor when the result of the determination indicates that the obtained oscillation frequency is the one of the predetermined resonance frequencies.

11. The motor control method according to claim 10, wherein the sensing operation comprises sensing and estimating a rotational speed of the rotor, which is rotated by a rotating magnetic field that is generated by sequentially flowing an electric current in the plurality of windings on the phase-by-phase basis upon the sequential application of the voltage to the plurality of windings.

* * * * *